(12) United States Patent
Drechsel

(10) Patent No.: US 11,649,895 B2
(45) Date of Patent: May 16, 2023

(54) DIVERTED PRESSURE REGULATOR FOR A LIQUID

(71) Applicant: Arno Drechsel, Lienz (AT)

(72) Inventor: Arno Drechsel, Lienz (AT)

(73) Assignee: Komet Austria GmbH, Lienz (AT)

( * ) Notice: Subject to any disclaimer, the term of this patent is extended or adjusted under 35 U.S.C. 154(b) by 0 days.

(21) Appl. No.: 17/365,934

(22) Filed: Jul. 1, 2021

(65) Prior Publication Data

US 2022/0373093 A1 Nov. 24, 2022

(30) Foreign Application Priority Data

May 18, 2021 (IT) .......................... 102021000012794

(51) Int. Cl.
| | |
|---|---|
| *F16K 1/12* | (2006.01) |
| *F16K 15/02* | (2006.01) |
| *F16K 17/30* | (2006.01) |
| *G05D 16/06* | (2006.01) |

(52) U.S. Cl.
CPC ............ *F16K 1/126* (2013.01); *F16K 15/026* (2013.01); *F16K 17/30* (2013.01); *G05D 16/0608* (2013.01); *Y10T 137/7808* (2015.04)

(58) Field of Classification Search
CPC ............................................... Y10T 137/7808
See application file for complete search history.

(56) References Cited

U.S. PATENT DOCUMENTS

| 444,082 | A | * | 1/1891 | Abbe | G05D 16/103 |
| | | | | | 137/505.25 |
| 4,543,985 | A | * | 10/1985 | Healy | G05D 16/0655 |
| | | | | | 137/505.21 |
| 5,881,757 | A | * | 3/1999 | Kuster | G05D 16/0608 |
| | | | | | 137/454.2 |
| 2005/0224117 | A1 | * | 10/2005 | Youngberg | G05D 16/0608 |
| | | | | | 137/505.25 |
| 2012/0285561 | A1 | * | 11/2012 | Lawyer | G05D 16/0608 |
| | | | | | 137/561 R |
| 2013/0126018 | A1 | * | 5/2013 | Drechsel | G05D 16/0647 |
| | | | | | 137/505.25 |
| 2015/0293539 | A1 | * | 10/2015 | Greenwood | G05D 16/0608 |
| | | | | | 137/505.28 |
| 2018/0120866 | A1 | * | 5/2018 | Drechsel | F16K 1/126 |
| 2019/0317534 | A1 | * | 10/2019 | Nelson | G05D 16/187 |
| 2020/0026313 | A1 | * | 1/2020 | Weingarten | F16K 47/08 |
| 2020/0102972 | A1 | * | 4/2020 | Chen | F15B 1/265 |
| 2021/0404572 | A1 | * | 12/2021 | Nelson | F16K 31/1223 |

\* cited by examiner

*Primary Examiner* — Robert K Arundale
(74) *Attorney, Agent, or Firm* — Themis Law

(57) ABSTRACT

A coaxial liquid pressure regulator includes a housing having an inlet portion and an outlet portion, a substantially tubular valve member slidingly accommodated inside the housing and having a longitudinal axial passage and an upstream end with an inlet edge for the liquid, a valve body fixed inside the inlet portion and defining a seat that interacts with the inlet edge of the valve member and forms therewith a port having a variable width. The inlet portion includes an inlet fitting and a collection chamber directly downstream from the inlet fitting and the valve body includes a cantilever element transversely extending from the inner wall of the collection chamber. First and second deflection elements are arranged between the inlet fitting and the inlet edge, which facilitate flow conveyance toward the port and the longitudinal passage of the valve member.

13 Claims, 4 Drawing Sheets

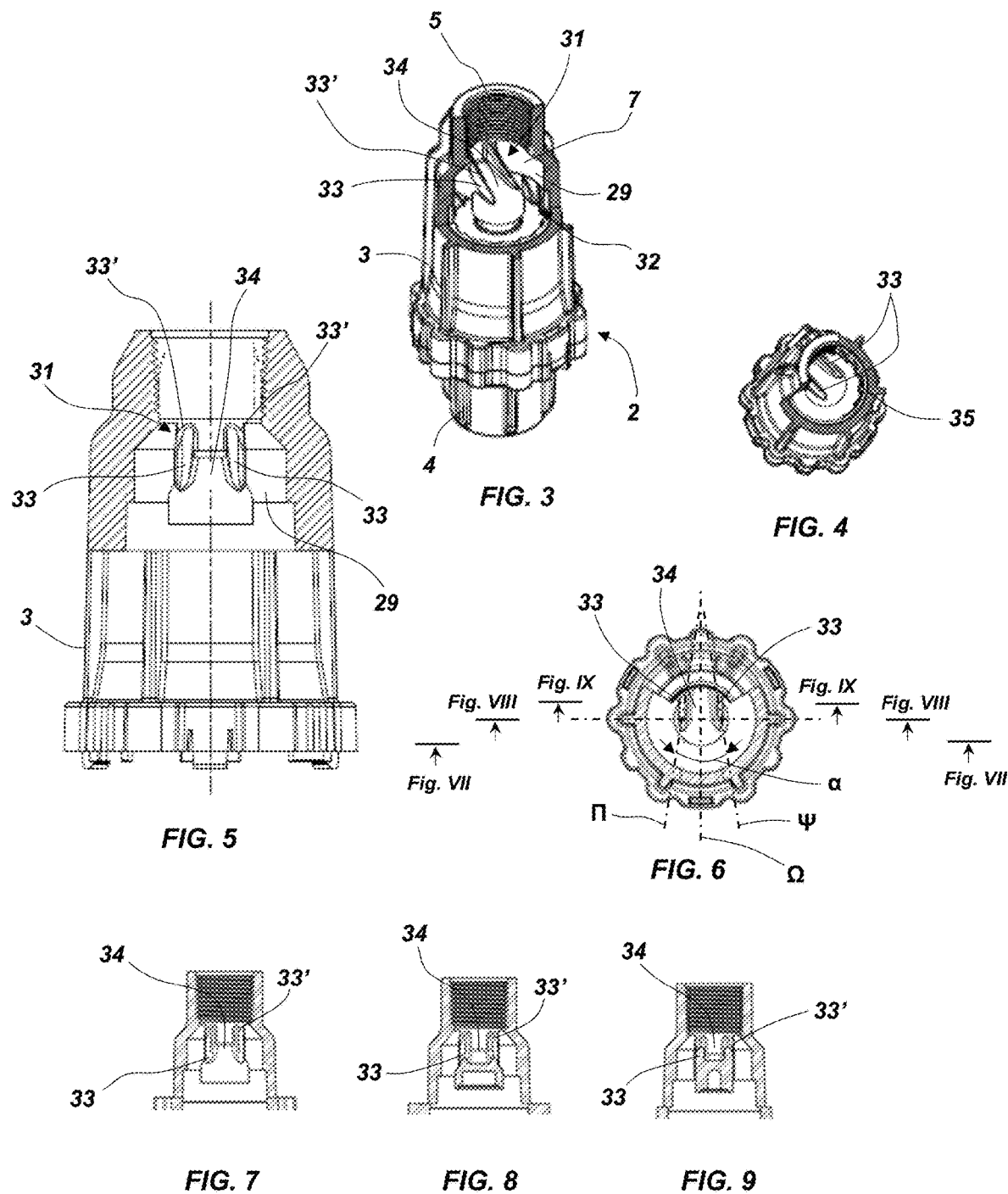

DIVERTED PRESSURE REGULATOR FOR A LIQUID

FIELD OF THE INVENTION

The present invention generally finds application in the field of irrigation systems for agricultural and industrial applications, and particularly relates to a liquid pressure regulator, particularly designed to be installed in irrigation systems or the like.

BACKGROUND OF THE INVENTION

Agricultural and/or industrial irrigation systems are known in the art, which comprise a liquid supply line connected to a plurality of sprinkler devices for distributing a jet of such liquid to a soil portion to be irrigated or cooled.

One requirement of these known systems is to distribute a substantially constant amount of liquid to a given soil portion, to irrigate or cool it in an approximately uniform manner.

The sprinkler devices may be either stationary, to always distribute the liquid over the same soil portion, or movable relative to the supply conduit for substantially constant-speed sweeping of a given cultivated surface.

Almost all the sprinklers for use in irrigation systems afford jet nozzle selection to adapt liquid distribution to the needs of the particular soil or crop.

Nevertheless, uniform liquid distribution requires a substantially constant jet pressure, regardless of the nozzle that is mounted to the sprinkler.

For this purpose, a pressure regulator connected to the supply line is typically installed upstream from the nozzle, with liquid having a relatively constant pressure value, set by the user or the supply line, at its outlet.

A typical regulator has a housing having a stationary valve seat therein and a movable tubular valve member which has an inlet edge adapted to interact with the valve seat to define a pressure regulating port.

The valve member is equipped with an annular diaphragm defining a liquid regulating chamber with the housing to move the valve member and vary the regulating port based on the liquid pressure, to maintain this pressure substantially constant.

U.S. Pat. No. 7,048,001 discloses a pressure regulating device as described hereinbefore. The axis of the valve seat and the axis of the inlet and outlet ports are inclined to each other to reduce the risk that grass or other materials may block the movement of the valve stem, thereby causing sudden pressure drops. In addition, the valve seat is joined to the housing by a single strut to reduce liquid flow resistance.

U.S. Pat. No. 10,386,867 by the Applicant hereof discloses a pressure regulating device, also as described hereinbefore, in which the liquid flow at the outlet has a substantially constant pressure under all operating conditions.

In this regulator the axis of the valve seat is offset but parallel to that of the valve member and to that of the end fittings of the housing.

In addition, the valve seat is joined to the housing by a pair of struts, whereby the seat is stronger and more resistant to pressure changes acting on the regulator. This configuration improves the liquid flow conditions along the walls of the housing and reduces the risk that impurities may be retained in the liquid. Nevertheless, transverse offsets of all components of the structure create obstacles to the liquid flow.

A problem of all these known regulators is the presence of obstacles along the liquid path, essentially consisting of the valve body which projects in cantilever fashion into the liquid collection chamber downstream from the inlet fitting. This causes drags and losses, thereby decreasing the effectiveness of the regulator and of the hydraulic circuit as a whole.

Technical Problem

In view of the prior art, the technical problem addressed by the invention is deemed to consist in reducing drags inside the regulator.

SUMMARY OF THE INVENTION

The object of the present invention is to solve the aforementioned technical problem and obviate the above discussed drawback, by providing a pressure regulator that is highly efficient and relatively cost-effective.

A particular object of the present invention is to provide a pressure regulator that can reduce friction inside the regulator.

A particular object of the present invention is to provide a pressure regulator that facilitates passage through its internal cavity upstream and downstream from the valve member.

These and other objects, as more clearly shown hereinafter, are fulfilled by a liquid pressure regulator according to the following description, which comprises a housing defining a longitudinal axis and having an inlet portion and an outlet portion, a substantially tubular valve member slidingly accommodated inside said housing and having a longitudinal axial passage and an upstream end with a liquid inlet edge, a valve body fixed inside the inlet portion with a seat configured to interact with the inlet edge of the valve member and to form a port of variable width therewith, wherein the inlet portion of the housing comprises an inlet fitting for connection to a liquid supply line and a collection chamber directly downstream from the inlet fitting, the valve body comprising a cantilever element extending transverse from the inner wall of the collection chamber, first and second deflection means being successively arranged between the inlet fitting and the inlet edge, to facilitate flow conveyance toward the port and the longitudinal passage of the valve member.

In one embodiment, the first deflection means comprise a pair of struts for bracing the connection of said cantilever element to the inner wall of said chamber.

In one embodiment, the second deflection means comprise a plurality of deflecting slides arranged on the periphery of said cantilever element and oriented toward the center of said chamber to convey the liquid toward said port and impart a rotating vortex motion to the flow.

With these deflection means, the flow of liquid directed toward the port and toward the axial passage of the valve member is improved by reducing the drag and the flow through the regulator.

Advantageous embodiments of the invention are obtained in accordance with the following description.

BRIEF DESCRIPTION OF THE DRAWINGS

Further features and advantages of the invention will be more apparent from the detailed description of a preferred, non-exclusive embodiment of a liquid pressure regulator of the invention, which is described as a non-limiting example with the help of the annexed drawings, in which:

FIGS. 3 and 4 are partially broken away perspective views of the regulator of FIG. 1;

FIG. 5 is a side view of the regulator of FIG. 3;

FIG. 6 is a top view of the regulator of FIG. 4;

FIGS. 7, 8 and 9 are side views of the regulator of FIG. 6 as taken along three different diametral planes;

DETAILED DESCRIPTION OF EMBODIMENTS OF THE INVENTION

Particularly referring to the above figures, a liquid pressure regulator of the invention is described, which is generally referenced 1.

As a non-limiting example, the regulator 1 may be installed in irrigation systems for uniform distribution of a liquid, e.g., water, over a predetermined area to be irrigated or cooled, not shown.

As used hereinafter, the term "upstream" refers to a backward position with respect to the direction of the liquid flow through the regulator and the term "downstream" refers to a forward position with respect to the direction of the flow through the regulator.

The regulator device 1 may be installed upstream from one or more sprinklers with nozzles, not shown, for the jet of liquid to be delivered at a substantially constant pressure, substantially irrespective of the size of the delivery nozzles that are mounted to the sprinklers.

"Substantially" indicates possible deviations from +5% to −5%.

Figure 1:
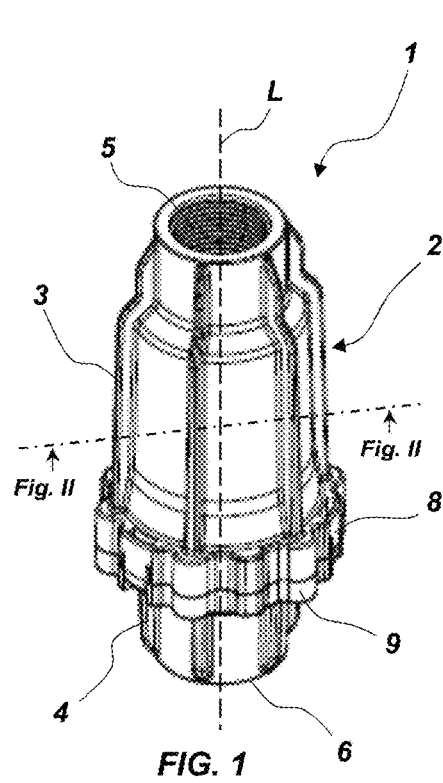
FIG. 1 is a perspective view of a pressure regulator according to the invention.
Figure 2:
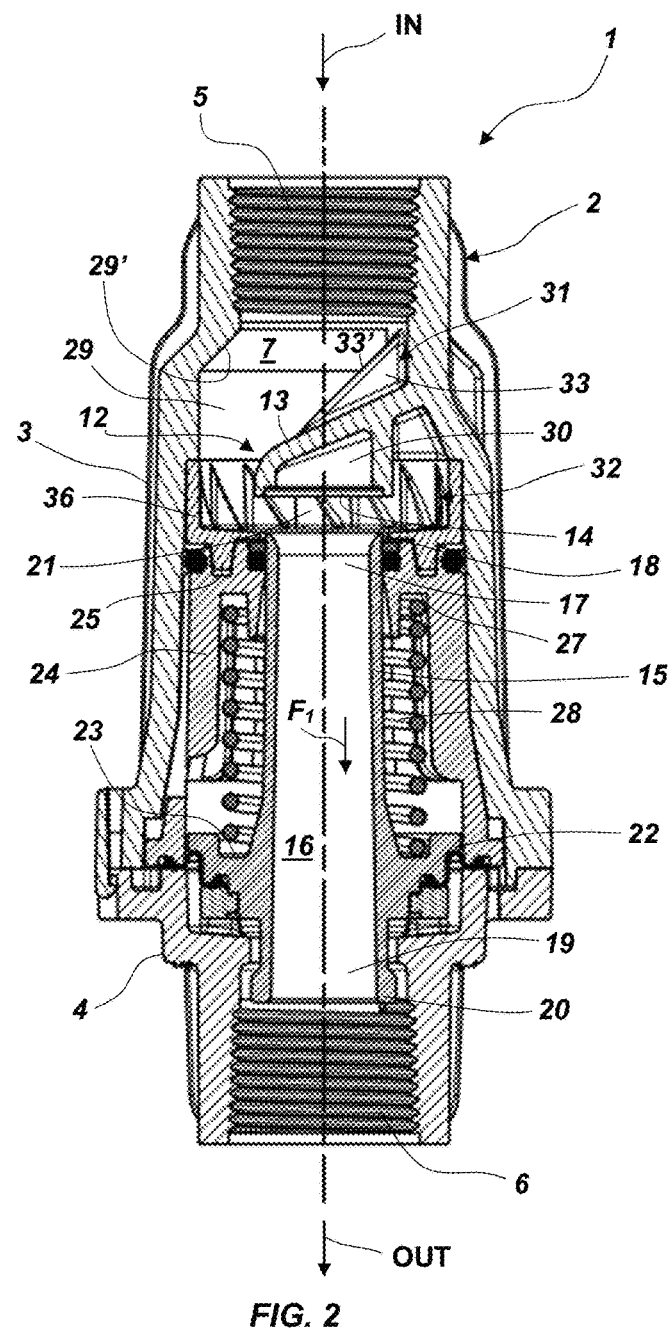
FIG. 2 is a partially broken away side view of the regulator of FIG. 1 as taken along an axial diametral plane.
Figure 10:
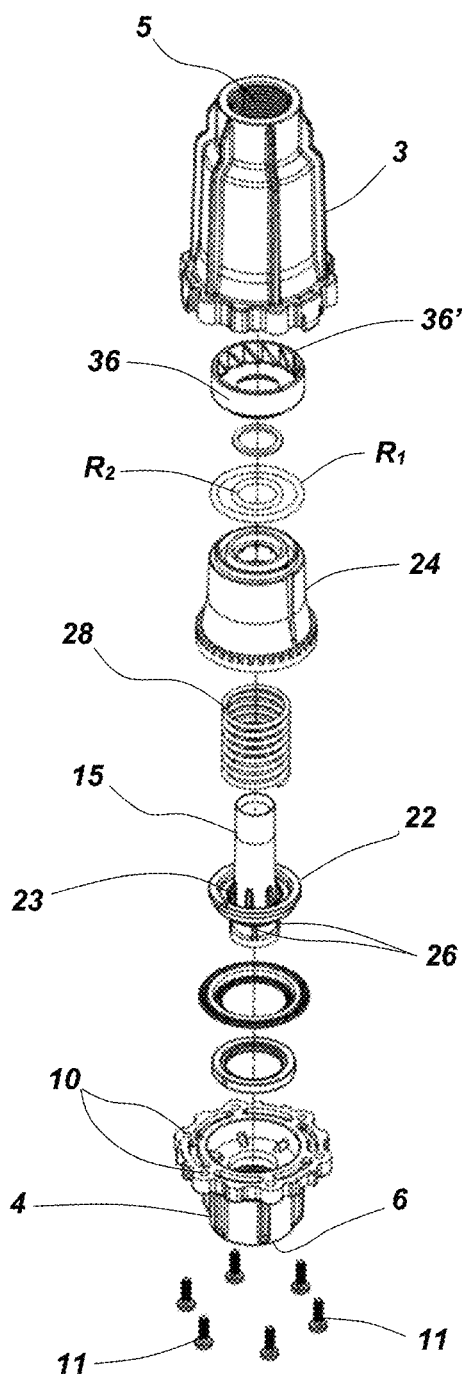
FIG. 10 is an exploded perspective view of the regulator of FIG. 1.
Figure 11:
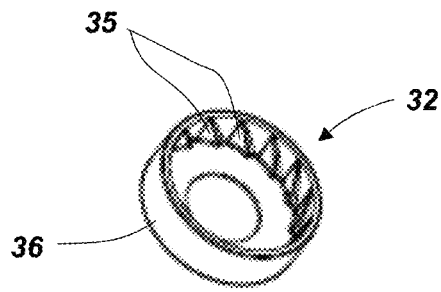
FIGS. 11 12 and 13 are perspective, side and top views of a particular of the regulator of FIG. 10 respectively.
Figure 12:
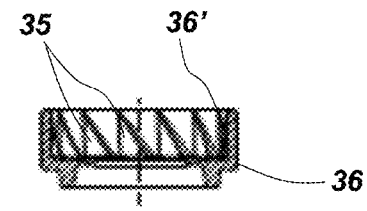
Figure 13:
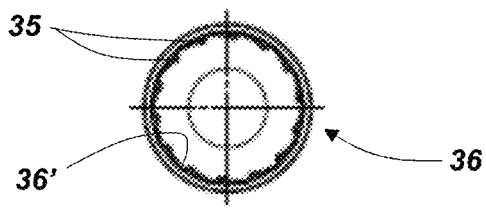

As shown in FIGS. 1 and 2, the pressure regulator 1 of the invention generally comprises a housing 2 defining a longitudinal axis L and having an inlet portion 3 and an outlet portion 4 for the liquid, with respective internally threaded inlet 5 and outlet fittings 6 for connection to a liquid supply line and to a sprinkler, both not shown, with the flow direction being designated by arrows IN and OUT, respectively.

In the embodiment as shown in the figures, the housing 2 is hollow and defines an interior compartment 7 which extends between the inlet fitting 5 and the outlet fitting 6.

The end portions 3, 4 may have a slightly flared shape with respective connecting flanges 8, 9 having holes 10 for removable connection, for example by means of screws 11.

As clearly shown in FIG. 2, a stationary valve body 12 is provided inside the compartment 7 of the housing 2 and has a curved surface 13 inclined toward the outlet and an opposite substantially flat surface perpendicular to the longitudinal axis L defining a valve seat 14.

The compartment 7 houses a tubular valve member 15 with a central passage 16, which is able to slide in two directions along the axis L.

The valve member 15 has an upstream end 17 with an inlet edge 18 for the liquid and a downstream end 19 with an outlet edge 20 from which the liquid exits after passing through the central passage 16.

The seat 14 of the valve body 12 is configured to interact with the inlet edge 18 of the valve member 15 and define a port 21 therewith for the passage of the liquid in response to the flow demand by the nozzle or distributor downstream from the regulator.

Toward its downstream end 19, the valve member 15 has a flange 22 with an annular groove 23 facing the inlet fitting 5.

In addition, a sleeve 24 is inserted between the valve member 15 and the inner surface of the housing 2 and has a collar 25 near its upper end with a calibrated central hole having the function to axially guide the valve member 15.

In order to ensure a perfectly axial movement of the valve member 15, longitudinal ribs 26 of calibrated thickness are formed on the outer surface of its downstream end 19.

An annular groove 27 is formed on the face of the collar 25 that faces the outlet fitting 6 and two annular grooves are formed on the opposite face to accommodate respective O-rings $R_1$ and $R_2$ forming a seal with respect to the inlet portion 3 of the housing 2.

A helical spring 28 is provided in a peripheral position with respect to the valve member 15, with ends accommodated in the groove 23 of the flange 22 and in the groove 27 of the collar 25 respectively, to bias the valve member 15 toward the outlet fitting 6 with a calibrated force $F_1$ directed toward the outlet fitting 6, as determined by the elastic constant of the spring 28.

As best shown in FIG. 3, the inlet portion 3 comprises a collection chamber 29 located directly downstream from the inlet fitting 5 and the valve body 12 comprises a cantilever element 30 which transversely extends from the inner wall 29' of the collection chamber 29.

According to the invention, first deflection means 31 and second deflection means 32 are successively arranged between the inlet fitting 5 and the inlet edge 18 of the valve member 15 to facilitate flow conveyance toward the port 21 and toward the longitudinal passage 16 of the valve member 15.

As best shown in FIGS. 3-9, the first deflection means 31 comprise a pair of struts 33 for bracing the connection of the cantilever element 30 to the inner wall 29' of the collection chamber 29.

Advantageously, the cantilever element 30 has an upstream surface 30' impinged upon by the flow and inclined with respect to the longitudinal axis L and the struts 33 substantially have the shape of fins decreasing in height from the inner wall 29' of the chamber 29 toward the upstream surface 30' of the cantilever element 30, so that the flow is not hindered and is channeled toward the port 21, as best shown in FIG. 2.

As best shown in FIG. 6, the fin-shaped struts 33 extend along planes π, ψ substantially parallel to the longitudinal axis L, have a substantially constant thickness s and an upper edge 33' inclined toward the downstream region to facilitate the flow toward the chamber 29.

Furthermore, the chamber 29 defines a diametral geometric plane Ω passing through the longitudinal axis L and the planes π, ψ of the fin-shaped struts 33 are symmetrically spaced apart from the diametral geometric plane Ω to thereby form a sliding channel 34 therebetween for conveying the flow toward the space of the chamber 29 that is not occupied by the valve body 12, without hindering it.

Preferably, the planes π, ψ of the fin-shaped struts 33 form a lateral deflection angle α with the diametral geometric plane Ω to facilitate flow conveyance on opposite sides from the diametral geometric plane Ω.

The lateral deflection angle α ranges from 1° to 5° and is preferably about 3°.

As best shown in FIGS. 3, 10-13, the second deflection means 32 comprise a plurality of deflecting slides 35 arranged on the periphery of the cantilever element 30 and oriented toward the center of the chamber 29 to convey the liquid toward the port 21 and impart a rotating vortex motion to the flow.

The deflecting slides 35 are rigidly joined to an annular insert 36 that is designed to be positioned on the bottom of the chamber 29, as best shown in FIG. 2. Specifically, the annular insert 36 abuts the upstream edge of the sleeve 24 and the deflecting slides 35 are formed on the inner wall 36' of the annular insert 36.

According to a particular aspect of the invention, the deflecting slides 35 are angularly equidistant and their circumferential width increases from upstream to downstream for easier emptying of the chamber 29.

Thus, the drag in the liquid flow on the parts of the regulator 1 is reduced, and the flow is accelerated toward the center of the chamber 29.

It will be appreciated that the first deflection means 31 and the second deflection means 32 facilitate, individually and in combination with each other, flow conveyance toward the port 21 and the longitudinal passage 16 of the valve member 15.

The above-described configuration eliminates the drawbacks of prior art regulators in that it ensures a uniform flow of the incoming liquid toward the port 21, thereby advantageously improving the hydraulic efficiency of the device and increasing the duration of the regulator 1 over time.

Therefore, the pressure regulator 1 of the invention, unlike prior art pressure regulators, does not have obstacles along the path of the liquid and does not cause drags and/or losses, thereby increasing the effectiveness of the regulator and the hydraulic circuit as a whole.

Figure 14:
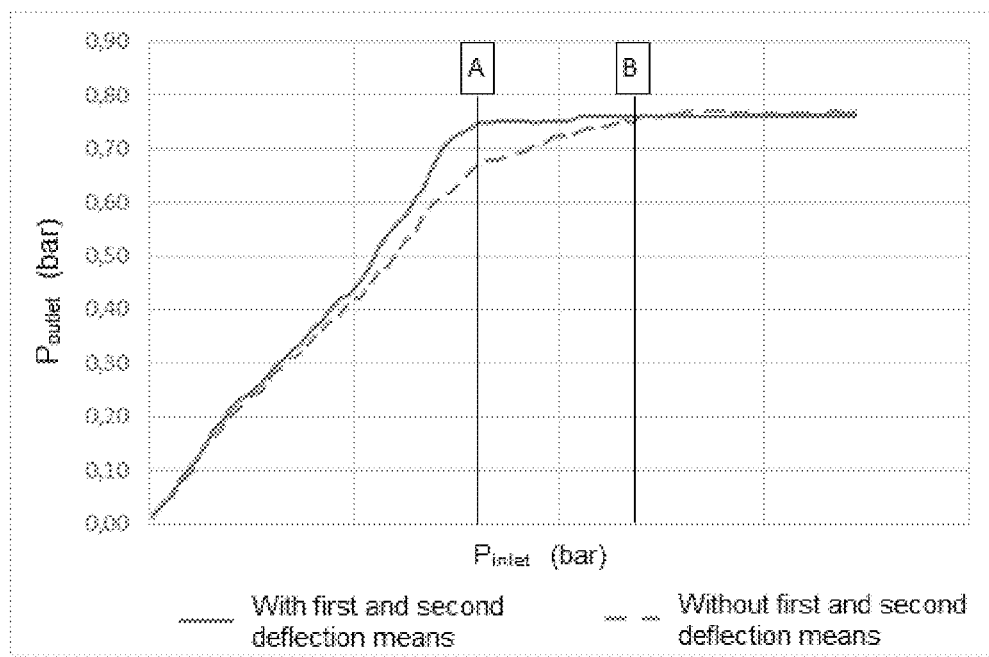
FIG. 14 is a chart of the inlet pressure $P_{inlet}$ and the outlet pressure $P_{outlet}$ of a regulator of the prior art and a regulator of the invention.

FIG. 14 shows a chart of the inlet pressure $P_{inlet}$ and the outlet regulated pressure $P_{outreg}$ of a regulator 1 having the first 31 and second deflection means 32 of the present invention and of a regulator without the first and second deflection means. Both pressures $P_{inlet}$ and $P_{outreg}$ are detected by suitable sensors, for example KELLER AG LEO digital pressure gages.

Due to the improved hydraulic flow inside the chamber 29, the outlet regulated pressure $P_{outreg}$ of the regulator 1 having the first 31 and second deflection means 32 is able to reach the nominal pressure in shorter times, which remains almost unchanged as the inlet pressure $P_{inlet}$ increases.

This figure shows that the regulator 1 having the first 31 and the second deflection means 32 reaches the nominal pressure at a lower inlet pressure value "A" as compared with a regulator of the prior art without such means, which reaches its nominal pressure at inlet pressure "B" that is higher than the inlet pressure "A". The difference between the pressures A and B represents the hydraulic efficiency differential of the regulator with the deflection means 31, 32 with respect to the one without such means.

The liquid pressure regulator of the invention is susceptible to a number of changes and variants, within the inventive concept disclosed in the appended claims. All the details thereof may be replaced by other technically equivalent parts, and the materials may vary depending on different needs, without departure from the scope of the invention.

While the liquid pressure regulator has been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry because it can be produced on an industrial scale in factories manufacturing hydraulic parts for fluids or parts of irrigation systems.

The invention claimed is:

1. A coaxial liquid pressure regulator, comprising:
a housing defining a longitudinal axis and having an inlet portion and an outlet portion;
a substantially tubular valve member slidingly accommodated inside the housing and having a longitudinal axial passage and an upstream end with an inlet edge for the liquid; and
a valve body fixed inside the inlet portion and defining a seat configured to interact with the inlet edge of the valve member and form therewith a port having a variable width;
wherein the inlet portion comprises an inlet fitting for connection to a liquid supply line, and a collection chamber directly downstream from the inlet fitting;
wherein the valve body comprises a cantilever element transversely extending from an inner wall of the collection chamber;
wherein first deflection elements and second deflection elements are successively arranged between the inlet fitting and the inlet edge to facilitate flow conveyance toward the port and the longitudinal passage of the valve member; and
wherein the second deflection elements comprise a plurality of deflecting slides arranged on a periphery of the cantilever element and oriented toward the center of the collection chamber to convey the liquid toward the port and impart a rotating vortex motion to the flow.

2. The coaxial liquid pressure regulator as claimed in claim 1, wherein the first deflection elements comprise a pair of struts for bracing the connection of the cantilever element to the inner wall of the collection chamber.

3. The coaxial liquid pressure regulator as claimed in claim 2, wherein the cantilever element has an upstream surface which is impinged upon by the flow and is inclined with respect to the longitudinal axis, the struts being substantially shaped as fins decreasing in height from the inner wall of the collection chamber toward the upstream surface of the cantilever element so that the flow is not hindered and is channeled toward the port.

4. The coaxial liquid pressure regulator as claimed in claim 3, wherein the fin-shaped struts extend along planes substantially parallel to the longitudinal axis, and have a substantially constant thickness and free edges inclined toward a downstream region to facilitate the flow toward the collection chamber.

5. The coaxial liquid pressure regulator as claimed in claim 4, wherein the collection chamber defines a diametric geometric plane which passes through the longitudinal axis, the planes of the fin-shaped struts being symmetrically spaced apart from the diametric geometric plane to thereby form a sliding channel therebetween for conveying the flow toward the space of the collection chamber that is not occupied by the valve body.

6. The coaxial liquid pressure regulator as claimed in claim 4, wherein the extension planes form a lateral deflection angle with the diametric geometric plane to facilitate flow conveyance on opposite sides from the diametral geometric plane.

7. The coaxial liquid pressure regulator as claimed in claim 6, wherein the lateral deflection angle ranges from 1° to 5°.

8. The coaxial liquid pressure regulator as claimed in claim 1, wherein the deflecting slides are formed on an inner side wall of an annular insert, which is designed to be placed on a bottom of the collection chamber.

9. The coaxial liquid pressure regulator as claimed in claim 8, wherein the inlet portion of the housing contains therein a substantially tubular sleeve with an annular collar having a calibrated central hole for axially guiding the valve member, the annular insert abutting the edge upstream from the sleeve.

10. The coaxial liquid pressure regulator as claimed in claim 1, wherein the deflecting slides are angularly equidistant and have a circumferential width that increases from upstream to downstream for easier emptying of the collection chamber.

11. A liquid pressure regulator, comprising:
   a housing having an inlet portion and an outlet portion;
   a tubular valve member slidingly accommodated inside the housing and having a longitudinal axial passage, the housing and the tubular valve member being longitudinally coaxial; and
   a valve body fixed inside the inlet portion and defining a seat configured to receive an inlet portion of the tubular valve member;
   wherein a collection chamber is defined in the inlet portion;
   wherein a cantilever element extends transversely from an inner wall of the collection chamber; and
   wherein deflection elements are arranged upstream of the tubular valve member, the deflection elements comprising a plurality of deflecting slides arranged on a periphery of the cantilever element and oriented toward the center of the collection chamber to convey the liquid toward the port and impart a rotating vortex motion to liquid flow.

12. The liquid pressure regulator according to claim 11, wherein the inlet and outlet portions are longitudinally coaxial with the housing and the tubular valve member.

13. The liquid pressure regulator according to claim 11, further comprising one or more struts disposed upstream of the deflection elements and connecting the cantilever element to the inner wall of the collection chamber.

* * * * *